(12) United States Patent
Gabara (10) Patent No.: US 7,894,617 B2
(45) Date of Patent: Feb. 22, 2011

(54) APPARATUS AND METHOD FOR INDENTIFYING THE GEOGRAPHIC LOCATION AND TIME IN A RECORDED SOUND TRACK BY USING A STEALTH MODE TECHNIQUE

(75) Inventor: Thaddeus John Gabara, Murray Hill, NJ (US)

(73) Assignee: ComfortLiving LLC, Murray Hill, NJ (US)

( * ) Notice: Subject to any disclaimer, the term of this patent is extended or adjusted under 35 U.S.C. 154(b) by 1424 days.

(21) Appl. No.: 11/311,859

(22) Filed: Dec. 19, 2005

(65) Prior Publication Data

US 2007/0140644 A1 Jun. 21, 2007

(51) Int. Cl.
*G09F 27/00* (2006.01)
(52) U.S. Cl. .................. 381/124; 348/143; 348/152
(58) Field of Classification Search ............ 381/56–57, 381/77–79, 111, 124; 348/143, 152
See application file for complete search history.

(56) References Cited

U.S. PATENT DOCUMENTS 6,091,826 A * 7/2000 Laitinen et al. ............ 381/82
6,219,645 B1 * 4/2001 Byers ........................ 704/275
7,428,310 B2 * 9/2008 Park ........................... 381/104

OTHER PUBLICATIONS

Infrasound—Brief Review of Toxicological Literature, Infrasound Toxicological Summary Nov. 2001.

* cited by examiner

Primary Examiner—Devona E Faulk
Assistant Examiner—Disler Paul
(74) Attorney, Agent, or Firm—Thaddeus Gabara (57) ABSTRACT

A stealth mode technique records information onto the sound track of a camcorder without the knowledge of the user. Infrasound is continuously generated by an array of audio sources placed in a geographical position that potentially encompasses the location of the recording device. A database stores the known characteristics of all audio sources. Once the recorded media is released to the public, a post analysis using a processing unit can decompose the recording back into a set of reconstructed audio sounds. An analysis can be performed to determine which audio sounds match the reconstructed audio sounds so that an estimate of the set of parameters associated with the sound track can be obtained. The set of parameters includes the geographical location and local time of the recording. The geographic location provides the opportunity to capture the terrorists and free the hostages.

29 Claims, 9 Drawing Sheets

APPARATUS AND METHOD FOR INDENTIFYING THE GEOGRAPHIC LOCATION AND TIME IN A RECORDED SOUND TRACK BY USING A STEALTH MODE TECHNIQUE

BACKGROUND OF THE INVENTION

Terrorists have been using technology to help achieve theirs goals. In particular, camcorders have been used to convey messages from terrorist leaders and present the kidnap victims to the world. In some cases, these victims have been beheaded where their gruesome images and sounds have been replayed from a recorded media.

One of the aspects of the camcorder is that the recorded media appear to be a very untraceable medium. That is, no one can determine when and where the recorded sound track was actually produced. This is one of the key aspects of the camcorder that gives the terrorist the comfort to use this device for propaganda purposes. That aspect is that the sound track does not contain data to determine the geographical location or time that the recorded sound track was made.

In general, the recorded sound track typically lacks the information necessary to find the set of parameters associated with the recording. However, it is the intent of this disclosure to show that a stealth mode technique may be incorporated to help alleviate and overcome this difficulty.

BRIEF SUMMARY OF THE INVENTION

The present invention uses a stealth mode technique which is recorded into the sound track of a camcorder or other recording device without the knowledge of the user who is using this recording device. The stealth mode technique incorporates non-audible sounds, for example infrasound, that are continuously generated by an array of audio sources placed in a geographical position that potentially encompasses the recording device.

These non-audible sounds may include infrasound. Thus, the recording device can be recording three or more of these audio sources without the knowledge of the user who is using the recording device. This is the stealth mode technique; generate infrasounds with known characteristics such as the position and the sound content of each of the audio sources over time.

A database can store the known characteristics of all audio sources for latter analysis. Once the recorded media is released to the public, a post analysis using a processing unit can be performed on the audio recoding to decompose the recording back into a set of reconstructed audio sounds. The processing unit compares the three or more reconstructed audio sounds to the database. An analysis can be performed to determine which audio sounds match the reconstructed audio sounds so that an estimate of the set of parameters associated with the sound track of the audio recording can be obtained.

The set of parameters includes the geographical location, calendar date and local time of the recording. Thus, this knowledge can be used to position security forces at this geographic location in an attempt to capture the terrorists and/or free the hostages.

DETAILED DESCRIPTION OF THE INVENTION

Figure 1:
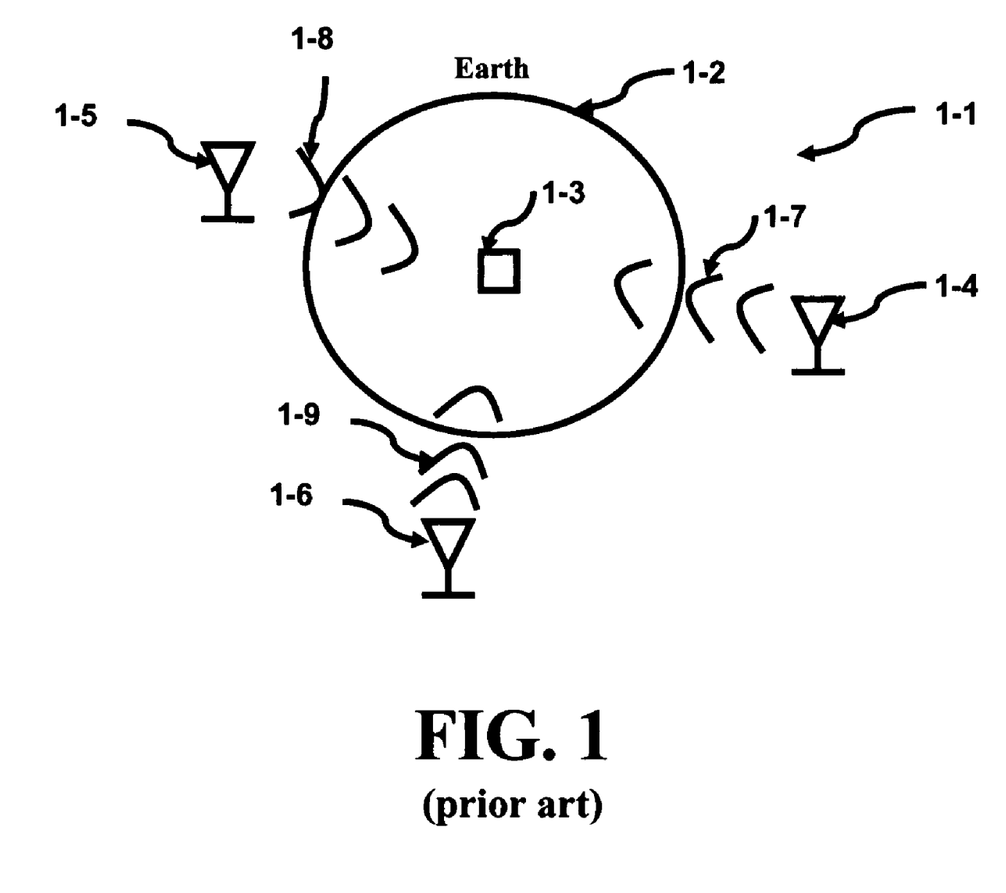
FIG. 1 depicts a prior art GPS where geographic locations can be determined.

A simple conceptual diagram 1-1 of a GPS (Global Positioning System) is illustrated in FIG. 1. Several satellites 1-4 through 1-6 are in orbit around the Earth 1-2. Each satellite emits an RF signal 1-7 through 1-9 that is detected by the GPS receiver 1-3 placed on Earth.

Figure 2:
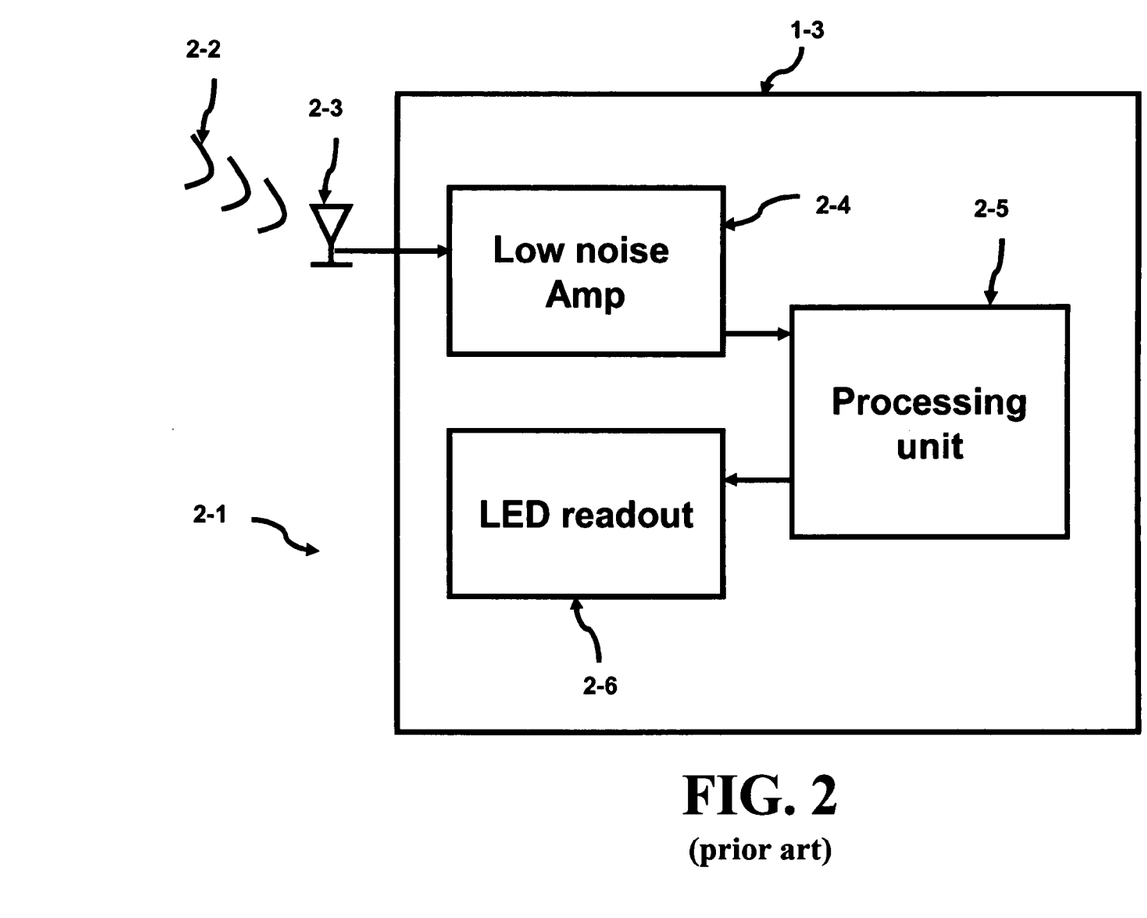
FIG. 2 illustrates the prior art portable GPS unit and several of its block contents.

FIG. 2 illustrates the block diagram 2-1 of the GPS receiver. The signals from the satellites where only one of the signals 2-2 is shown, is sensed by the antenna 2-3 and applied to the low noise amplifier 2-4. The output of the amplifier sends this data to the processing unit 2-5 which analyses the contents of the three or more received radio signals from the satellite and determines the geographical location of the GPS receiver by triangulation. The geographical location can consist of altitude, longitude and latitude. This information is then applied to the LED readout 2-6 or similar display to indicate the location to the user. Note that this system encompasses all data necessary to help determine the location. The GPS unit 1-3 contains all the data necessary that has been extracted from the RF signals and immediately displays the geographical location. Thus, the processing unit 2-5 knows that all the data is available to determine the geographical location.

Figure 3:
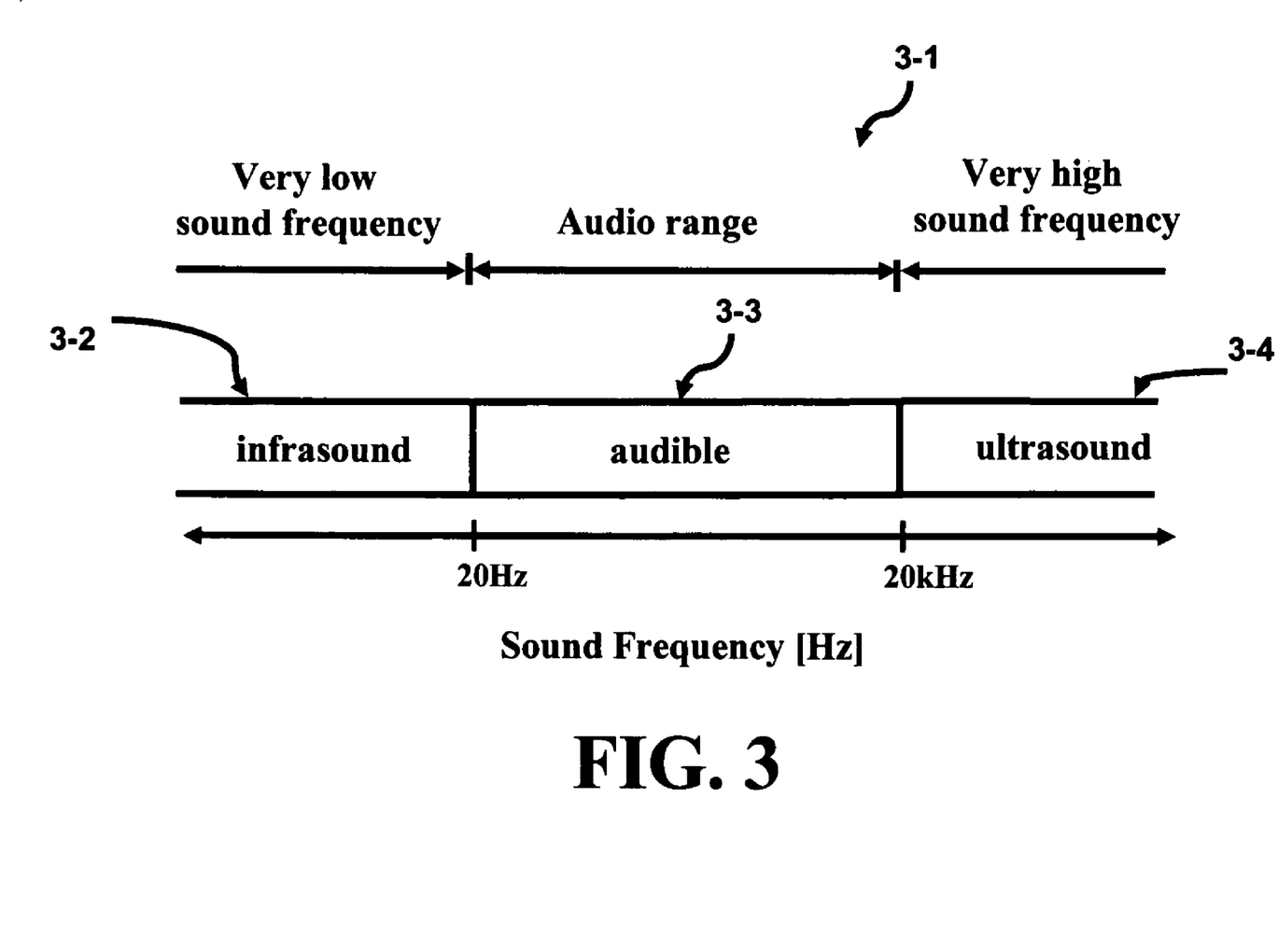
FIG. 3 illustrates the audio spectrum of sound frequencies.

FIG. 3 illustrates the spectrum 3-1 of audio sounds spanning from infrasound to ultrasound. Note that the audible sounds 3-3 for humans ranges from 20 Hz to 20 kHz. Infrasound 3-2 is located below 20 Hz, while ultrasound 3-4 is above 20 kHz. It is important to note that these boundaries are approximate and also depends on the intensity of the sound.

Figure 4:
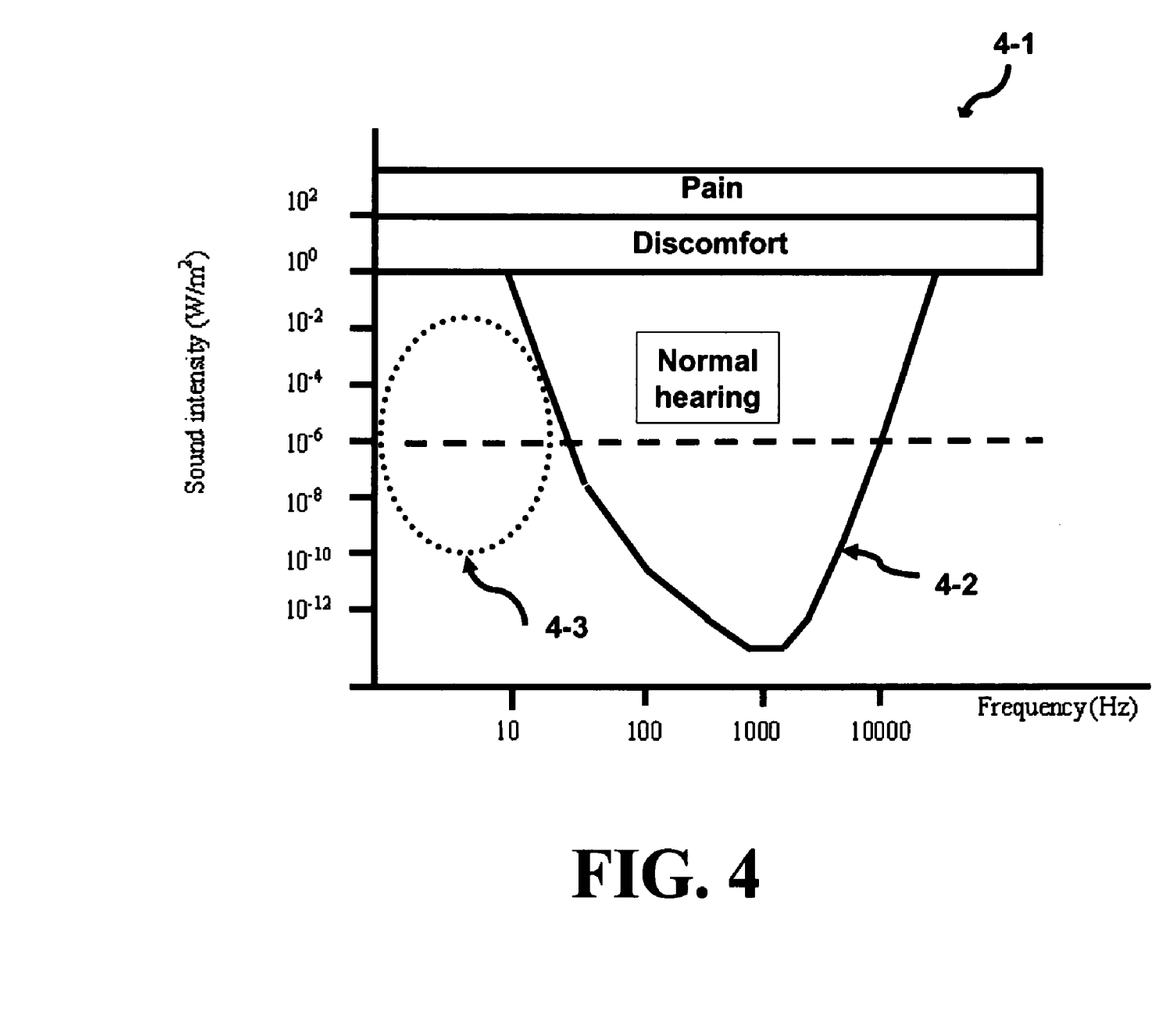
FIG. 4 shows the sound intensity versus the audio frequency.

FIG. 4 illustrates the sound intensity 4-1 as a function of audio frequency. Note that above 1 W/m² the sound causes discomfort in humans. If the intensity is above 100 W/m², the sound causes pain. However, below 1 W/m², a curve 4-2 is displayed where normal hearing occurs. It is easily seem that the boundary between the infrasound and audible sound does not occur at exactly 20 Hz. The curve 4-2 has a negative slope in its line. The intensity of the sound plays a role where this cutoff exists. Thus, the region 4-3 can be considered the infrasound region.

Figure 5:
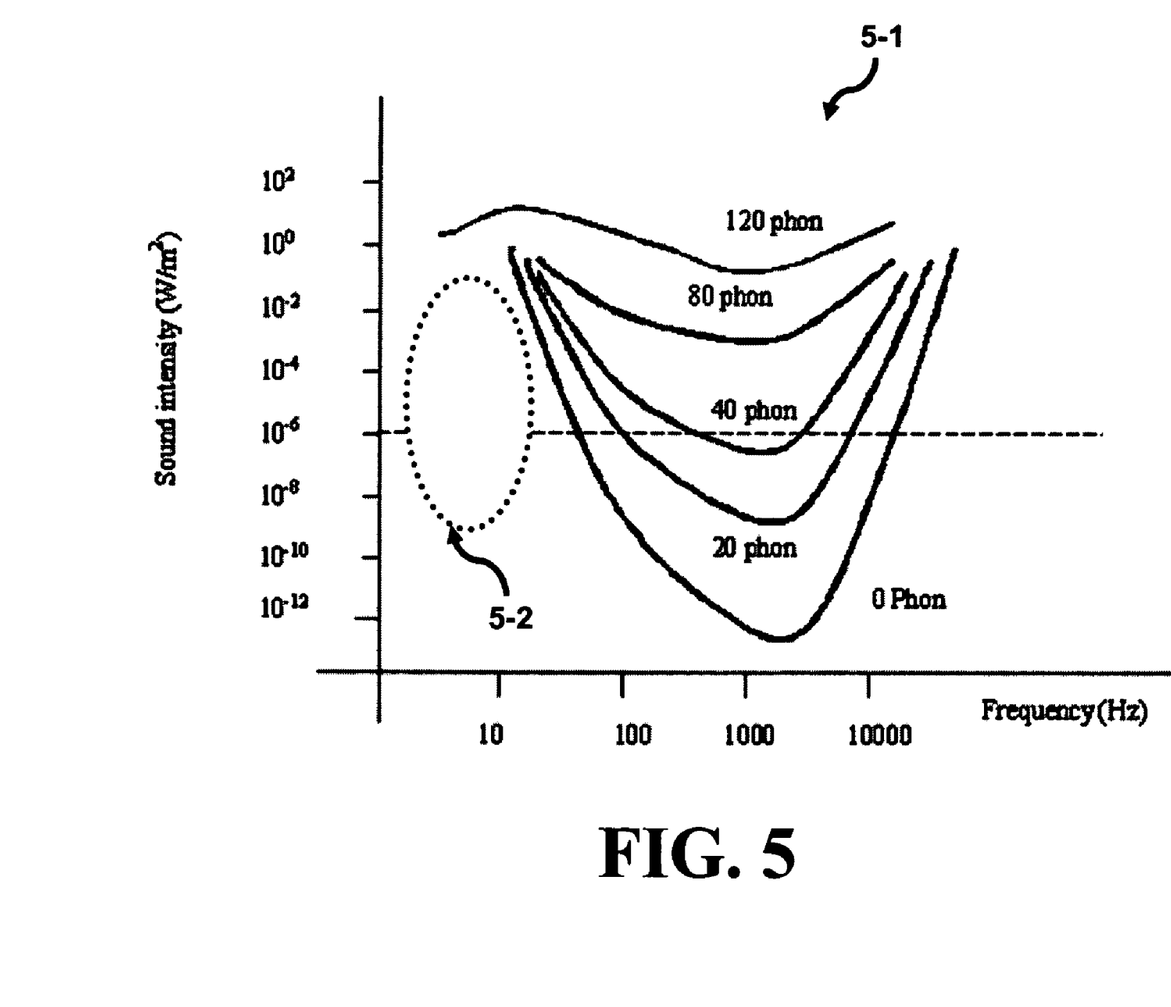
FIG. 5 depicts the perceived constant sound intensity of humans versus the audio frequency.

FIG. 5 further illustrates the sound intensity 4-1 as a function of audio frequency. This time, the contours are for the cases where the human ear senses equal intensities. For example, the 0 phon curve at about 3 kHz only requires an intensity of $10^{-12}$ W/m² to be heard. However at 10 Hz, the intensity needs to be increased about 12 orders of magnitude before this sound can be perceived by humans. Thus the region 5-2 indicates that the power of the infrasound can be increased without humans perceiving the sound. This occurs because humans have a natural built in low pass filter.

This is a positive aspect since the intensity of the infrasound can be increased without being sensed by humans. Because infrasound can carry considerable energy, these low pitched sounds travel effectively for long distances. Elephants have been shown to send infrasound up to a distance of 5 km. Because. infrasound has a long wavelength, it is difficult to block these energy signals. Infrasound travels at 300 meters/sec in air, 1500 meters/sec in water and more than 2000 meters/sec in soil. Thus, there are several modes of carrying the infrasound signal.

Figure 6:
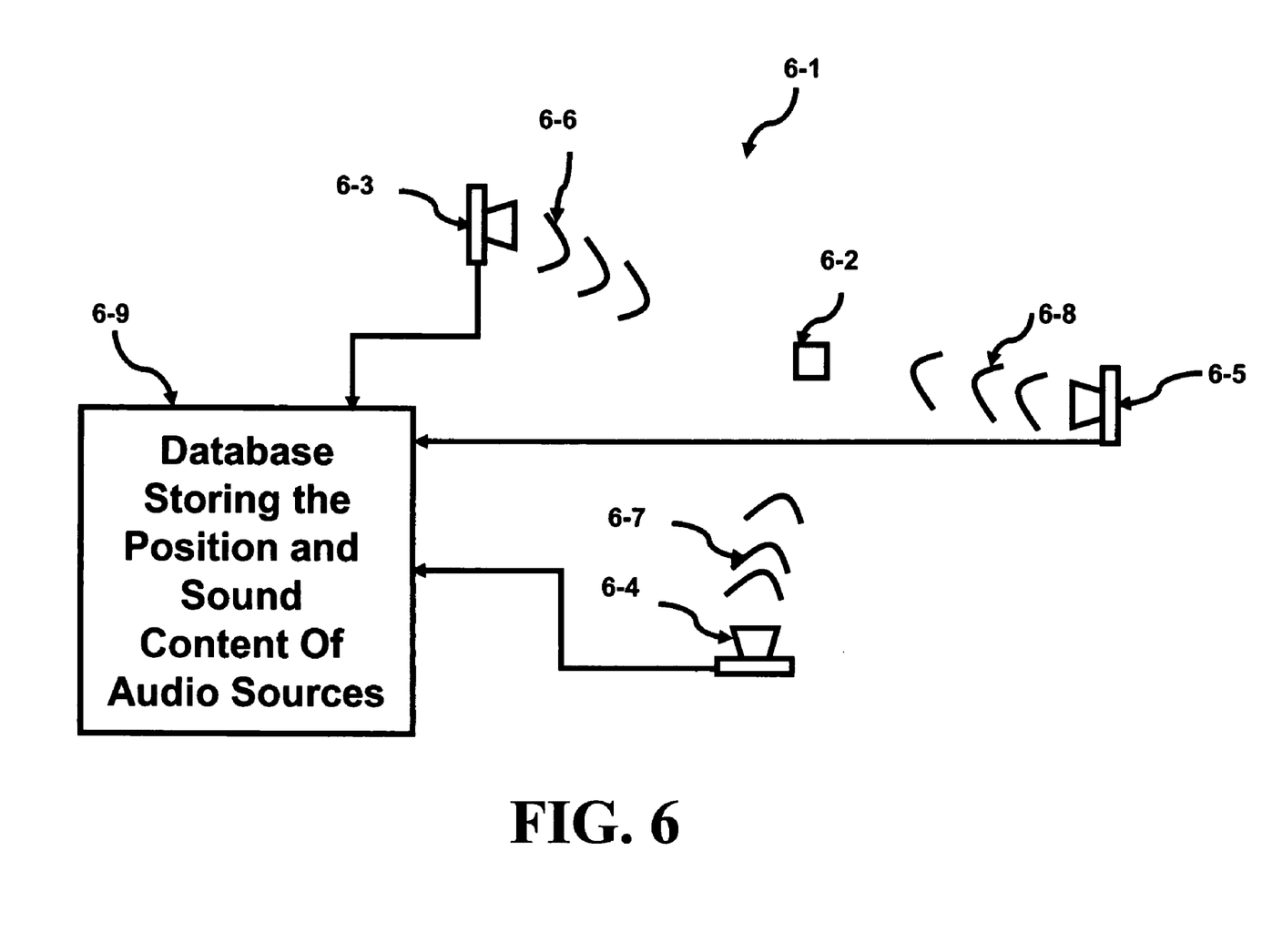
FIG. 6 illustrates a database storing the position and sound content of several audio sources as a function of time in accordance with the present invention.

FIG. 6 illustrates an aspect in accordance with the present invention. The region 6-1 contains a camcorder 6-2, or an equivalent recoding device, In addition, several infrasound transmitters 6-3 through 6-5 each generate an audio sound 6-6 through 6-8. The sound content of these audio sounds is an audio characteristic that may include the amplitude, phase, wavelength, frequency, bandwidth and modulation of these sounds. Ideally, the audio characteristics of each audio source are designed to be different so that identification of the audio source can occur easier. In other words, the frequencies, phase, modulation, etc. of all audio sources can be different to help identify the particular audio source. Another aspect of the audio sources is their geographical position. The audio source can be stationary, moving, buried or hidden. All of these characteristics can be stored in a database 6-9 over time to be utilized at a later date.

Figure 7:
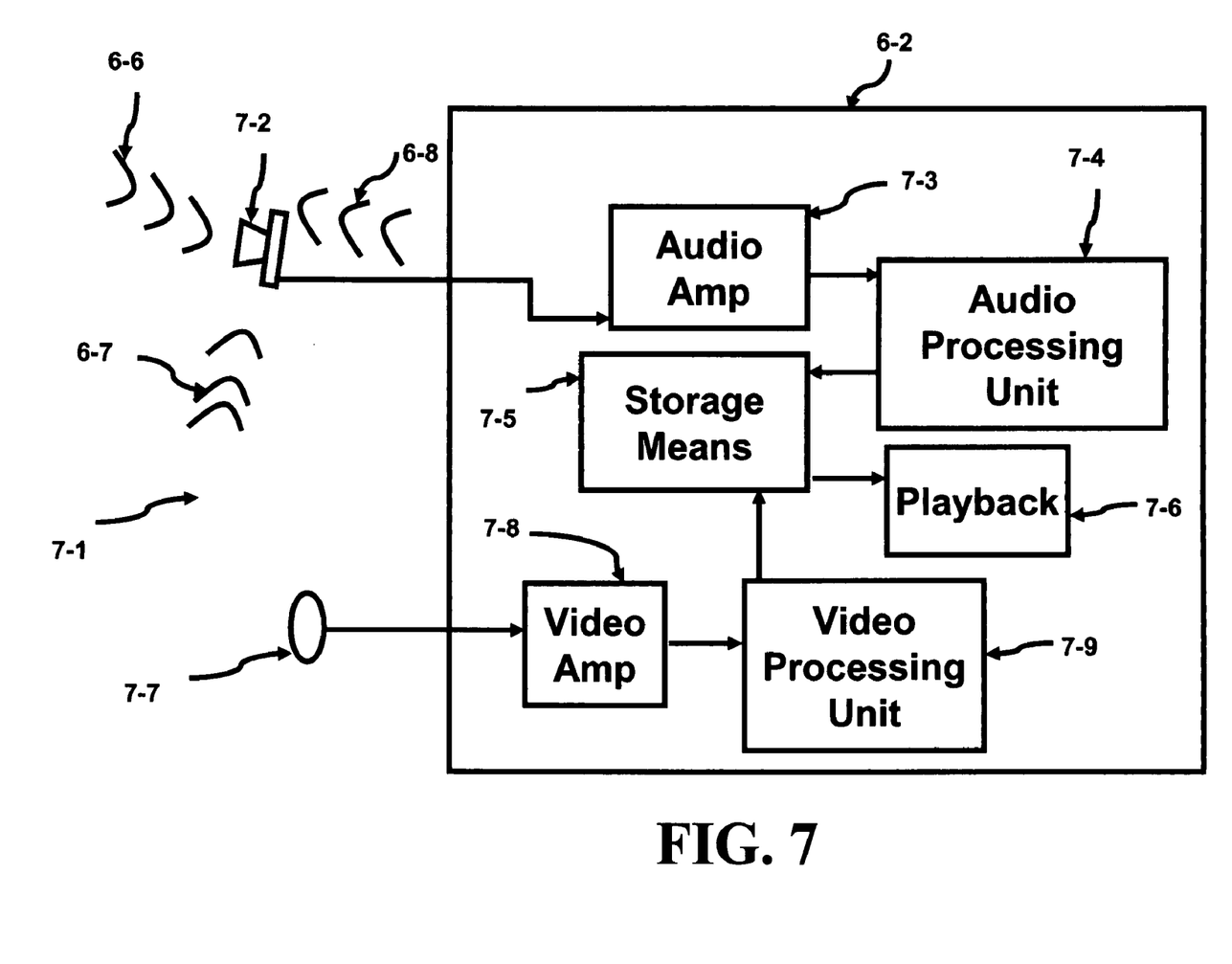
FIG. 7 illustrates a camcorder recording a video and several audio signals simultaneously.

FIG. 7 illustrates a block diagram of the camcorder 6-2 given in FIG. 6. The specification of the audio system of the camcorder often shows an audio frequency response of 20 Hz to 20 kHz. In addition, there is a low frequency role off term of 12 dB per octave. Thus, the low frequency is not a brick wall, allowing the sensitivity of the camcorder to decrease on a 12 dB slope. Thus, this role off and the region 5-2 of FIG. 5 complement each other. Thus, it is possible for the camcorder to record the infrasound even though the sound is not sensed. Further more, the infrasound may be able to have a frequency content above 20 Hz if the sound intensity is low enough to not be sensed as indicated in region 5-2.

FIG. 7 illustrates a system 7-1 including the block diagram of the camcorder 6-2 given in FIG. 6 including the microphone 7-2 and the optical system 7-7. The microphone 7-2 picks up the three infrasound signals 6-6 through 6-8 initially shown in FIG. 6. In addition, 7-7 picks up the image to be stored into a storage unit. The audio signal is applied to the audio amp 7-3 and the audio processing unit 7-4 prepares the audio signal for the storage means. This storage means can include magnetic tape, hard disk, solid state integrated circuits or holography. In addition, the video amp 7-8 sends the video signal to the video processing unit 7-9 which is then applied to the storage means 7-5.

Figure 8:
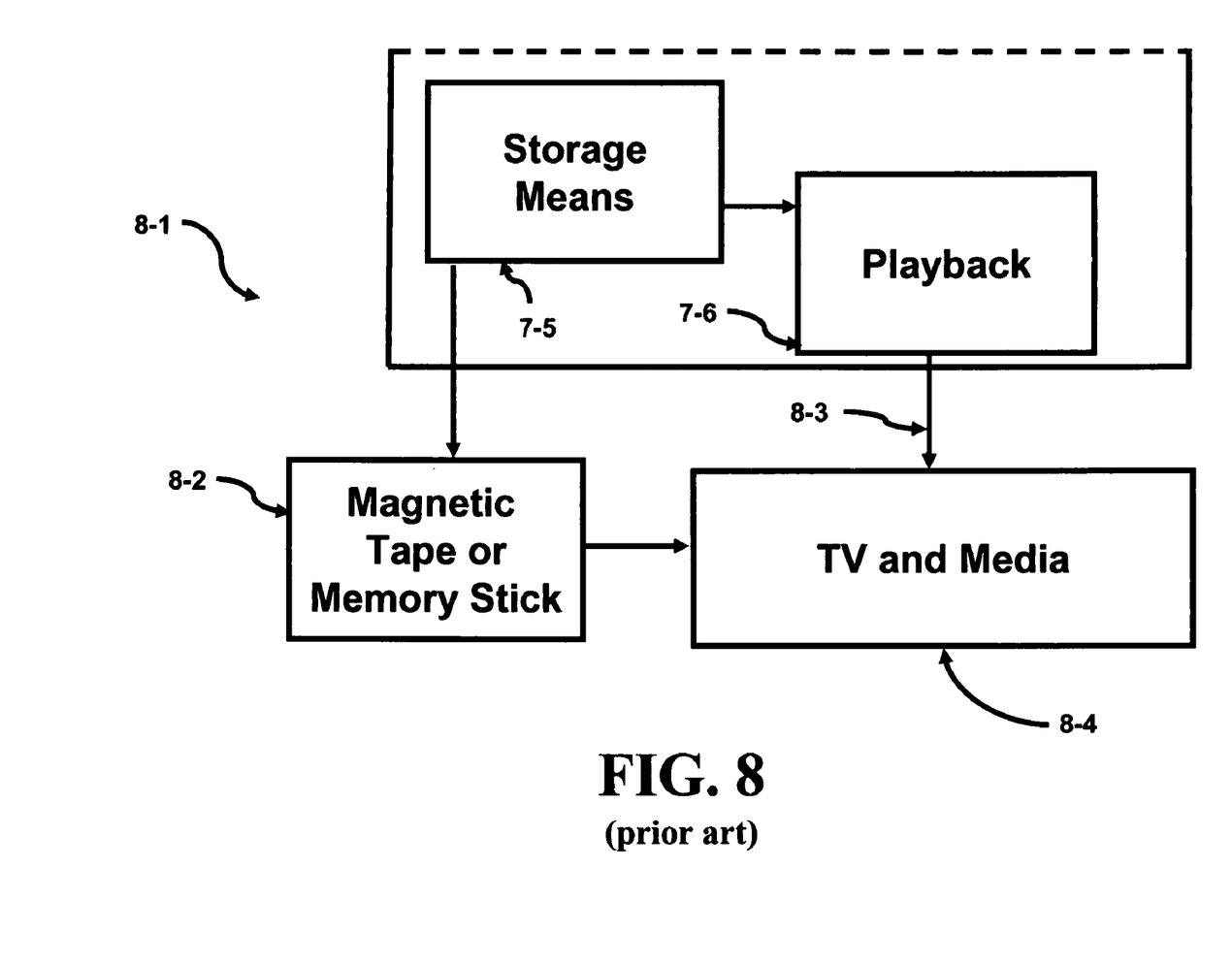
FIG. 8 shows how the storage means and playback portions of the camcorder can be sent to the TV and media corporations.

The camcorder has the ability to playback 7-6 the stored signal on a local LCD screen. FIG. 8 illustrates interface 8-1 between the storage means 7-5 and the playback 7-6 to the outside world. A magnetic tape 8-2 or equivalent hard disk, solid state integrated circuits or holography can be used to copy the contents of the storage means and sent to the TV and media 8-4. The playback signal can be applied directly to the TV and media 8-4 as well.

Figure 9:
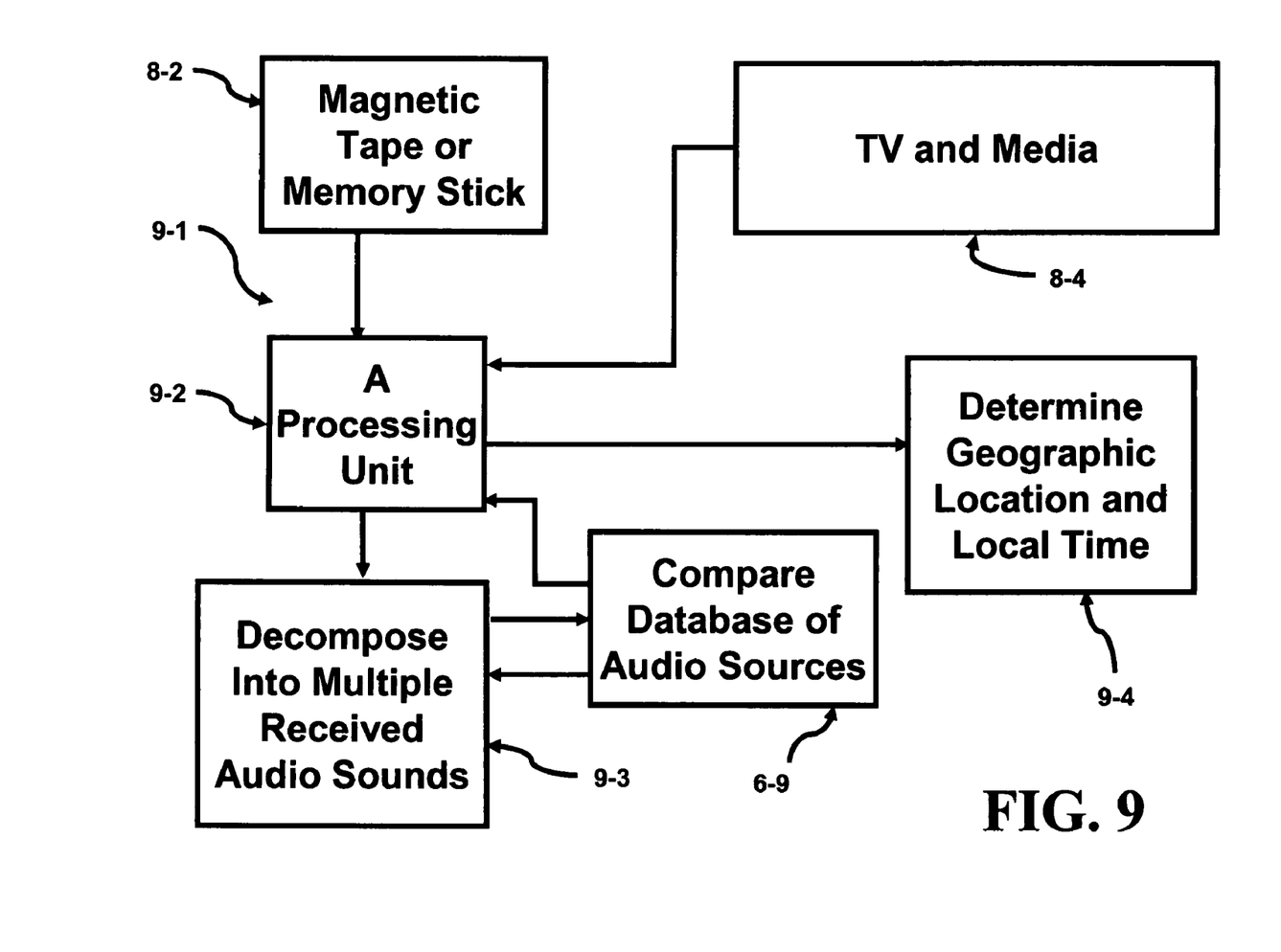
FIG. 9 shows how the storage means and playback portions can be applied to a processing unit and a database to determine the geographic location and local time when the sound track was made in accordance with the present invention.

FIG. 9 illustrates the system 9-1 to extract the geographic location and local time 9-4 in accordance with the present invention. The output of the magnetic tape 8-2 or the TV and media 8-4 can be applied to a processing unit 9-2 to decompose the received audio signal into multiple reconstructed received audio sounds 9-3. These sounds 9-3 can be compared to the database 6-9 to determine the best match of the reconstructed sounds 9-3 against the initial sounds stored in the database 6-9. Once there is a match, the processing unit 9-2 can determine the geographic location and local time of the previously recorded audio signal. Thus, security forces can be sent to this location in an attempt to capture the terrorists.

Finally, it is understood that the above descriptions are only illustrative of the principles of the current invention. In accordance with these principles, those skilled in the art may devise numerous modifications without departing from the spirit and scope of the invention. For example, the audio sources can be moving and their geographic position can be determined using GPS. The audio sources can be buried to further conceal these transducers. And the processing units can be selected from a DSP, microprocessor, ASIC or FPGA. In addition, the processing unit can use an algorithm selected from the group consisting of DFT, FFT and Wavelets. Finally, even low intensity audio or ultrasound can be incorporated into this design by those skilled in the art to find the position.

What is claimed is:

1. A system using audio sounds inaudible to humans to identify a set of parameters associated with a sound track of an audio recording comprising;
    three or more audio sources generating audio sounds that are inaudible; wherein each audio source possesses a geographical position and a sound content that is known as a function of time; and
    a database that stores the geographical position and the sound content of each of the audio sources over time;
    the sound track contains a composite of the audio recording of the three or more audio sources; and
    a processing unit to decompose the audio recording back into reconstructed audio sounds; wherein the processing unit compares three or more reconstructed audio sounds to the database to estimate the set of parameters associated with the sound track of the audio recording.

2. The system of claim 1, wherein the audio sound is infrasound or ultrasound.

3. The system of claim 1, wherein the sound content is an audio characteristic selected from the group consisting of amplitude, phase, wavelength, frequency, bandwidth and modulation.

4. The system of claim 1, wherein the geographical position can be determined using a GSP system.

5. The system of claim 1, wherein the processing unit is a calculation unit selected from the group consisting of DSP, microprocessor, ASIC and FPGA.

6. The system of claim 1, wherein the database comparison uses an algorithm selected from the group consisting of DFT, FFT and Wavelets.

7. The system of claim 1, wherein the set of parameters is geographical location, calendar date or local time.

8. The system of claim 1, wherein the set of parameters are determined by a triangulation technique using the three or more reconstructed audio sounds.

9. The system of claim 1, wherein one of the audio sources is stationary, moving, buried or hidden.

10. The system of claim 1, wherein the sound track is a storage component selected from the group consisting of magnetic tape, hard disk, solid state integrated circuits and holography.

11. A method using audio sounds inaudible to humans to identify a set of parameters associated with a sound track comprising the steps of;
    providing at least three audio sources that each generate an audio sound that is inaudible;

storing in a database characteristics of all audio sources as a function of time;
recording a combined sound of at least three of the audio sounds on the sound track;
reconstructing three or more audio sounds from the combined sound; and
comparing the reconstructed audio sounds to the database; thereby using the audio sounds that are inaudible to identify the set of parameters associated with the sound track.

12. The method of claim 11, wherein the audio sound is infrasound or ultrasound.

13. The method of claim 11, wherein the set of parameters is geographical location, calendar date or local time.

14. The method of claim 11, wherein the set of parameters are determined by a triangulation technique using the three or more reconstructed audio sounds.

15. The method of claim 11, wherein one of the audio sources is stationary, moving, buried or hidden.

16. The method of claim 11, wherein the sound track is a storage component selected from the group consisting of magnetic tape, hard disk, solid state integrated circuits and holography.

17. The method of claim 16, wherein the storage component also contains a video recorded portion.

18. The method of claim 11, wherein a characteristic of the audio source is selected from the group consisting of intensity, pitch, frequency, modulation and geographical position.

19. The method of claim 13, wherein the geographical location can be determined using a GSP system.

20. The method of claim 11, further including the steps of using a processing unit to decompose the sound track into the reconstructed audio sound; and
comparing the three or more reconstructed audio sounds to the database to estimate the set of parameters associated with the sound track of the audio recording.

21. The method of claim 20, wherein the processing unit is a calculation unit selected from the group consisting of DSP, microprocessor, ASIC and FPGA.

22. The method of claim 20, wherein the processing unit uses an algorithm selected from the group consisting of DFT, FFT and Wavelets.

23. A system to identify a set of parameters associated with a sound track comprising:
three or more audio sources each generating an audio sound inaudible to humans;
means for storing in a database characteristics of the audio sources as a function of time;
means for recording a combined sound of at least three audio sounds that are inaudible on the sound track;
means for generating three or more reconstructed audio sounds from the combined sound means; and
means for comparing the reconstructed audio sound means to the database means; thereby using the combined sound to identify the set of parameters associated with the sound track.

24. The system of claim 23, wherein the audio sound is infrasound or ultrasound.

25. The system of claim 23, wherein the audio source has is an audio characteristic selected from the group consisting of intensity, pitch, frequency and modulation.

26. The system of claim 23, wherein a processing unit is used to decompose the sound track into the reconstructed audio sound, and the processing unit is a calculation unit selected from the group consisting of DSP, microprocessor, ASIC and FPGA.

27. The system of claim 23, wherein the set of parameters is geographical location, calendar date or local time.

28. The system of claim 23, wherein the set of parameters are determined by a triangulation technique using the three or more reconstructed audio sounds.

29. The system of claim 23, wherein the sound track is a storage component selected from the group consisting of magnetic tape, hard disk, solid state integrated circuits and holography.

* * * * *